Patented Feb. 3, 1942

2,271,866

UNITED STATES PATENT OFFICE 2,271,866

RECOVERY OF HYDROGEN HALIDE

Thomas R. Liston, Hamburg, N. Y., assignor to Allied Chemical & Dye Corporation, a corporation of New York No Drawing. Application December 1, 1939, Serial No. 307,115

9 Claims. (Cl. 23—154)

This invention relates to the recovery of hydrogen halide from a gaseous mixture containing hydrogen halide and vapors of organic compounds such, for example, as the mixtures produced in the carrying out of a Friedel and Crafts type of reaction.

Generally, Friedel and Crafts reactions such as those involving reaction of a halogenated kerosene with an aromatic unsulfonated compound in the presence of a condensing agent such as anhydrous aluminum chloride or anhydrous zinc chloride are effected at temperatures within the range of 0° C. to refluxing temperatures of the mixture, for example, at temperatures of from about 5° C. to about 200° C. At such temperatures gaseous hydrogen halide which forms during the reaction leaves the reaction zone, associated usually with appreciable amounts of vapors of the organic constituents of the reaction mixture. Even if the hydrogen halide gas is cooled by being passed through a reflux condenser or other equipment for removing condensible organic vapor from the gas, the amount of organic vapors in the cooled gas may be appreciable. For example, in the condensation reaction in which a chlorinated kerosene fraction of petroleum distillate is condensed with benzene, the gas evolved during the reaction is a mixture of hydrogen chloride gas and organic vapors, chiefly benzene vapors, the latter forming about 5 to about 25% by weight of the gas.

In similar Friedel and Craft condensation reactions in which it is convenient to use an inert low-boiling organic solvent such as carbon tetrachloride, the gases evolved during the condensation reaction usually contain in addition to the hydrogen halide, organic vapors of which the vapors of the inert solvent can be a considerable portion.

Attempts heretofore made to recover the gaseous constituents of such benzene-hydrogen chloride gas mixtures have involved cooling the mixtures to the freezing point of the benzene in order to condense and remove the benzene vapors, and then recovering the hydrogen chloride as hydrochloric acid by scrubbing the residual gas with water. Such a method has been found to be unsatisfactory; benzene has relatively high vapor pressure even at temperatures at or near its freezing point, and is not satisfactorily removed from the hydrogen chloride when the gaseous mixtures are cooled. Further, substantial amounts of the benzene appear as undesirable films of condensed benzene in the hydrochloric acid produced by scrubbing the residual gas with water.

United States Patent 1,831,474 discloses the recovery of hydrogen chloride from a gaseous mixture containing a substance which will form a film on water by carrying out the absorption of the hydrogen chloride with water under conditions such that the film-forming substance is maintained in vapor phase throughout the absorption. This method introduces additional difficulties: for example, in the case of gas mixtures which contain benzene vapors, in order to maintain the benzene in vapor form, in the acid scrubber where the gas is scrubbed with water to produce hydrochloric acid, high temperatures are needed, and such temperatures cause a considerable amount of water vapor and hydrogen chloride to accompany the organic vapors when the latter leave the scrubber. This outgoing mixture, as pointed out in the specification of this patent, must be scrubbed again, for example, with caustic alkali, to remove the residual acid material before the organic vapors and water vapors are condensed, and if the condensed organic material is to be used in another condensation reaction, it must be dried. Furthermore, the venting and dissipating of benzene vapors, and particularly wet acid benzene vapors, involve the hazards of fire and explosion.

It is an object of this invention to provide a process for recovering hydrogen halide and organic constituents from the gaseous mixture produced in the reaction between an organic halide and an organic material, such, for example, as the gaseous mixtures produced in the Friedel and Crafts type of reaction, which process does not involve the difficulties and hazards hereinabove pointed out. Other objects and advantages of this invention will be apparent from the following description thereof.

In accordance with this invention, the gas mixture leaving the zone of reaction is contacted with an organic compound of substantially the same composition as one of those used in carrying out the reaction, at a temperature such that the vapor pressure of the organic compound used as the contacting or scrubbing medium is small or negligible, and substantially none of the scrubbed organic compound is vaporized, to effect substantially complete removal of the organic vapors which are present in the gas mixture leaving the reaction zone, and the residual scrubbed gas containing hydrogen halide is then contacted with an aqueous medium to recover the hydrogen halide. The term "gas mixture" as used in the specification and claims is intended to include vapors as well as gases produced or present during the reaction.

This invention is particularly applicable to the recovery of hydrogen halide from gas mixtures produced in reactions in which one of the reacting constituents is chemically inert with respect to hydrogen halide and has a low vapor pressure at the temperature of absorption so that this reacting constituent may be used to absorb the organic vapors mixed with the hydrogen halide. Thus, for example, in condensation reactions between chlor-kerosene mixtures and benzene, the gas mixture from the condensation may be scrubbed with substantially the same chlor-kerosene mixture as is used in the condensation. Due to the low vapor pressure of the chlor-kerosene mixture little of it is vaporized in the absorber. In the condensation of chlorinated paraffin oil (i. e., chlorinated commercial "white oil") with benzene, the gas mixture leaving the reaction zone may be scrubbed with substantially the same chlorinated "white oil" as is used in the condensation. In this manner, the gas mixture leaving the condensation zone is substantially denuded of its organic vapors, and the residual gas can be absorbed in cold water to recover hydrochloric acid of commercial strengths. At suitable intervals, e. g., when the scrubbing charge of halogenated organic compounds in the liquid phase used as the absorbing medium has become diluted by the removed organic vapors to a point where the partial pressure of the absorbed hydrocarbons is so high as to prevent efficient absorption of the organic vapors from the gas mixture, the diluted halogenated organic absorbing medium is replaced with fresh material. The removed absorbing medium may be assayed for its content of halogenated organic compound and absorbed constituents and used as a part of the reaction charge of a subsequent condensation.

The process herein described has been found to be particularly applicable to condensation reactions between an aromatic compound and a chlor-kerosene mixture (comprising alkyl monochlorides together with some alkyl polychlorides and unchlorinated kerosene) which is obtained by chlorinating a petroleum fraction wherein the constituent hydrocarbons have an average content of 7 or more carbon atoms, preferably from 10 to 30 carbon atoms and especially from 12 to 23 carbon atoms. Of the aromatic compounds which may thus be condensed may be mentioned benzene, toluene, xylene, phenol, naphthalene and phenetole; of these, benzene and phenol are preferred. The temperature at which the absorption of the organic vapors is carried out, utilizing chlor-kerosene mixture as the absorbing medium, is such that the partial pressure of the absorbed organic material in the chlorinated hydrocarbon is low, and for all practical purposes in the case of the preferred compounds hereinabove mentioned, may advantageously be within the range of from about −10° C° to about 40° C.

In general, because there is no chemical reaction between the gases and the absorbing medium, there is substantially no temperature increase in the absorbing medium due to chemical reaction. The gases may be cooled before they are brought into contact with the absorbing medium, which in all cases can be adjusted to operate at a convenient temperature range wherein the partial pressure of the absorbed organic vapors in the absorbing medium is low. Operating within this temperature range, efficient recovery of volatile material results and complicated and difficult cooling arrangements need not be used.

As exemplary applications of the invention, the following are given. It is to be understood that the examples are illustrative and are not to be considered as limitations of the invention. The parts are by weight.

*Example 1.*—600 parts of chlor-kerosene mixture (made by chlorinating a Pennsylvania kerosene having a boiling range from 180° to 280° C. at 760 mm. with chlorine gas at about 60° C. in the presence of a small amount of iodine until the organically combined chlorine in the mixture is about 1.25 times that theoretically required for monochlorination) were added evenly over a period of about 20 minutes to an agitated mixture of 420 parts benzene and 24 parts anhydrous aluminum chloride, while the agitated mass was maintained at a temperature of 25° to 35° C. The gases leaving the condensing mass were scrubbed with 500 parts chlor-kerosene mixture which was maintained at about 28° to 30° C. The scrubbed gases were then contacted with 323.7 parts water which was maintained at about 25° C.

At the end of the condensation reaction, the scrubbing charge of chlor-kerosene mixture increased in weight by 23.5 parts, the increase being due substantially to the benzene which the chlor-kerosene mixture had absorbed from the gases. The removed charge was assayed for its content of chlorinated kerosene and absorbed compounds and used as part of the reacting charge of a subsequent condensation.

The water with which the scrubbed gases were contacted absorbed 66.3 parts hydrogen chloride to form 390 parts of hydrochloric acid having a specific gravity of 1.081 at 25° C.

*Example 2.*—500 parts of a mixture of alkyl bromides which correspond to the alcohols obtained by hydrogenation of the fatty acids from cocoanut oil, were added evenly over a period of 20 minutes to an agitated mixture of 1000 parts benzene and 25 parts anhydrous aluminum chloride, while the agitated mass was maintained at a temperature of 25° to 35° C. The gases leaving the condensing mass were scrubbed with 500 parts of the aforesaid mixture of alkyl bromides, maintained at 22° to 25° C. The scrubbed gases were then brought into contact with about 500 parts water maintained at 22° to 25° C.

At the end of the condensation reaction, the scrubbing charge of alkyl bromide mixture had increased in weight by 25 parts; it was removed for use as part of a reacting charge of a subsequent condensation.

The water with which the gases had been scrubbed, absorbed about 100 parts hydrogen bromide to form about 600 parts of aqueous hydrobromic acid.

*Example 3.*—The condensation mass obtained in Example 2 was allowed to settle; the upper layer of oil was separated from the lower heavy tar, and fractionally distilled. The distillate which boiled from 75° C. at 5 mm. absolute pressure to 235° C. at 5 mm. absolute pressure was collected separately as a mixture comprising chiefly mono alkyl benzenes.

To an agitated mixture of 106 parts anhydrous aluminum chloride and 600 parts carbon tetrachloride at about 10° C., a mixture of 240 parts of the foregoing distilled fraction of alkyl benzenes and 88 parts of chloracetyl chloride was added evenly over a period of about 20 to 30 minutes, while the resulting agitated mass was maintained at a temperature of 10° to 15° C. Then the mass was agitated without cooling until the condensation reaction therein to form chlor methyl ketones of the alkyl benzenes was complete. The gases leaving the condensing mass were scrubbed with 240 parts of the distilled fraction of alkyl benzenes maintained at 25° to 30° C. The scrubbed gases were then brought into contact with about 200 parts water maintained at about 25° C.

At the end of the condensation reaction, the scrubbing charge of mixed alkyl benzenes had increased in weight by about 10 parts, the increase being due chiefly to absorbed carbon tetrachloride. This charge was removed for use as part of a reacting charge of a subsequent condensation.

The water with which the gases had been scrubbed absorbed about 18 parts hydrogen chloride to form about 218 parts of aqueous hydrochloric acid.

The process of this invention, it will be noted, has a number of advantages over procedures heretofore used for handling the hydrogen halide and accompanying organic vapors obtained from the type of reaction hereinabove described. This process effects the recovery of organic vapors in dry, readily usable form; it is not necessary to subject the recovered material to any rescrubbing or drying treatments. The hydrogen halide recovery is not complicated by any abnormal requirements of temperature regulation. The low temperatures which can be used for the recovery of the organic vapors and the hydrogen halide reduce the hazards arising from inflammable vapors and explosive gas mixtures. Furthermore, the equipment necessary for carrying out the process is simple and relatively inexpensive.

Since certain changes may be made in carrying out the above process without departing from the scope of the invention, it is intended that all matter contained in the above description shall be interpreted as illustrative and not in a limiting sense.

What is claimed is:

1. A process for recovering hydrogen halide from a gas mixture containing the same and organic vapors produced in the reaction of a halogenated organic compound with an organic compound, which comprises scrubbing the gas mixture with an organic compound of substantially the same composition as one of those employed in the reaction at a temperature such that substantially none of the said organic compound is vaporized to remove organic vapors substantially completely from the gas mixture, and thereafter removing the hydrogen halide from the residual gases.

2. A process for recovering hydrogen halide from a gas mixture containing the same and organic vapors produced in the reaction between a halogenated organic compound and an organic compound, which comprises scrubbing the gas mixture with a halogenated organic compound of substantially the same chemical composition as that employed in the said reaction at a temperature such that substantially none of the halogenated organic compound is vaporized to remove organic vapors from the gas mixture, and thereafter scrubbing the gas mixture with water to recover the hydrogen halide.

3. A process for recovering hydrogen halide from a gas mixture containing the same and the vapors of an aromatic compound produced in the condensation of the halide of an organic compound with an aromatic compound, which comprises scrubbing the gas mixture with a halogenated organic compound of substantially the same composition as that used in carrying out the said condensation reaction at a temperature such that substantially none of the halogenated organic compound is vaporized to remove vapors of the aromatic compound, and thereafter scrubbing the gas mixture with an aqueous medium to recover the hydrogen halide.

4. A process for recovering hydrogen chloride from a gas mixture produced in the condensation of chlor-kerosene mixtures with an aromatic compound, which process comprises scrubbing the gas mixture with a chlor-kerosene mixture of substantially the same composition as that used in carrying out the said reaction to remove vapors of the aromatic compound present in the said gas mixture, and thereafter scrubbing the gas mixture with water to recover the hydrogen chloride as hydrochloric acid.

5. A process which comprises condensing a chlorinated petroleum hydrocarbon distillate containing from 10 to 30 carbon atoms with an aromatic compound of the group consisting of benzene, toluene, xylene, phenol, naphthalene and phenetole, scrubbing the evolved mixture of hydrogen chloride and vapors of the aromatic compound with a chlorinated petroleum distillate of substantially the same composition as that used in the reaction to absorb said vapors, removing the hydrogen chloride from the residual gas, and condensing the chlorinated petroleum distillate containing absorbed constituents with said aromatic compound.

6. A process which comprises condensing a chlorinated petroleum hydrocarbon distillate containing from 12 to 23 carbon atoms with benzene, scrubbing the evolved mixture of hydrogen chloride and benzene with a chlorinated petroleum distillate of substantially the same composition as that used in the reaction at a temperature within the range of −10° to 40° C. to absorb the benzene vapors, scrubbing the residual gas with water to recover the hydrogen chloride as hydrochloric acid, and condensing the chlorinated petroleum containing absorbed constituents with additional benzene.

7. A process for recovering hydrogen halide from a gas mixture containing the same and organic vapors produced in the reaction of a halogenated organic compound with an organic compound, at least one of said organic compounds having a low vapor pressure at the temperature at which it will absorb vapors of the organic compound produced in the reaction, which process comprises scrubbing the gas mixture with the said organic compound having low vapor pressure at the temperature of absorption to remove substantially completely the organic vapors present in the gas mixture, and thereafter scrubbing the gas mixture with an aqueous medium to remove the hydrogen halide from the gas mixture.

8. A process for recovering hydrogen bromide from a gaseous mixture produced in the condensation of an alkyl bromide with benzene, which process comprises scrubbing the gas mixture with an alkyl bromide of substantially the same composition as that used in carrying out the said reaction to remove vapors of the benzene present in the said gas mixture, and thereafter scrubbing the gas mixture with water to recover the hydrogen bromide as hydrobromic acid.

9. A process for recovering hydrogen halide from a gas mixture containing the same and also containing organic vapors of an inert low-boiling organic solvent evolved during the reaction between a halogenated organic compound and an organic compound in the presence of the inert low-boiling organic solvent, which comprises scrubbing the gas mixture with an organic compound of substantially the same composition as one of those employed in the reaction at a temperature such that substantially none of the said organic compound is vaporized and the said organic vapors of the inert low-boiling organic solvent are removed substantially completely from the gas mixture, and thereafter scrubbing the gas mixture with an aqueous medium to remove the hydrogen halide from the residual gas.

THOMAS R. LISTON.